(12) United States Patent
Van Lunteren (10) Patent No.: US 9,582,420 B2
(45) Date of Patent: Feb. 28, 2017

(54) PROGRAMMABLE MEMORY MAPPING SCHEME WITH INTERLEAVE PROPERTIES

(71) Applicant: International Business Machines Corporation, Armonk, NY (US)

(72) Inventor: Jan Van Lunteren, Gattikon (CH)

(73) Assignee: International Business Machines Corporation, Armonk, NY (US)

( * ) Notice: Subject to any disclaimer, the term of this patent is extended or adjusted under 35 U.S.C. 154(b) by 1 day.

(21) Appl. No.: 14/661,010

(22) Filed: Mar. 18, 2015

(65) Prior Publication Data

US 2016/0275013 A1 Sep. 22, 2016

(51) Int. Cl.
*G06F 12/06* (2006.01)

(52) U.S. Cl.
CPC .. *G06F 12/0607* (2013.01); *G06F 2212/1041* (2013.01); *G06F 2212/657* (2013.01)

(58) Field of Classification Search
CPC .............................. G06F 12/0607; G06F 12/10
USPC ......................................... 711/202, 216, 220
See application file for complete search history.

(56) References Cited

U.S. PATENT DOCUMENTS

| | | | |
|---|---|---|---|
| 6,381,668 B1 | 4/2002 | Lunteren | |
| 6,453,380 B1 * | 9/2002 | Van Lunteren | ..... G06F 12/0607 711/157 |
| 6,454,380 B1 * | 9/2002 | Endo | ...................... B41J 2/0451 347/19 |
| 6,880,064 B1 * | 4/2005 | Brown | ................ H04L 45/7457 711/216 |
| 7,398,362 B1 | 7/2008 | Tischler | |
| 7,872,657 B1 | 1/2011 | Edmondson et al. | |
| 7,970,980 B2 * | 6/2011 | Hillier, III | .......... G06F 12/0813 711/154 |
| 7,996,597 B1 | 8/2011 | Venkatramani et al. | |
| 8,074,010 B2 | 12/2011 | Hutson | |
| 2005/0175005 A1 * | 8/2005 | Brown | ................ H04L 45/7457 370/389 |
| 2009/0271562 A1 | 10/2009 | Sinclair | |
| 2014/0025908 A1 | 1/2014 | Sharma et al. | |
| 2015/0312224 A1 * | 10/2015 | Michiels | ................. H04L 9/002 713/168 |

OTHER PUBLICATIONS

Tsai et al., "A Generalized Conflict-Free Memory Addressing Scheme for Continuous-Flow Parallel-Processing FFT Processors With Rescheduling," IEEE Transactions on Very Large Scale Integration (VLSI) Systems, vol. 19, No. 12, Dec. 2011, pp. 2290-2302.

* cited by examiner

*Primary Examiner* — Pierre-Michel Bataille
(74) *Attorney, Agent, or Firm* — David Zwick (57) ABSTRACT

Mapping an address for memory access in a memory system into a combination address that includes a memory bank identifier and a memory bank internal address. The address is partitioned into a first portion, and a second portion. The memory bank identifier is determined by performing a look-up operation in a look-up matrix, in which a look-up matrix row is determined by the value of the first portion, and a look-up matrix column is determined by the value of a binary number with two or more bits formed by applying a parity function to two or more respective sub-portions of the second portion. The memory bank internal address is derived based on the second portion of the address.

14 Claims, 11 Drawing Sheets

PARITY VECTOR OVER 6 BITS:
$1^{ST}$ BIT: PARITY OVER 3 EVEN BITS $[B_0, B_2, B_4]$
$2^{ND}$ BIT: PARITY OVER 3 ODD BITS $[B_1, B_3, B_5]$ $$Y \begin{pmatrix} & 00b & 01b & 10b & 11b \\ 0 & 0 & 1 & 2 & 3 \\ 1 & 2 & 3 & 0 & 1 \\ 2 & 1 & 0 & 3 & 2 \\ 3 & 3 & 2 & 1 & 0 \end{pmatrix}$$

| | | | | |
|---|---|---|---|---|
| 63 | 255 | 191 | 223 | 159 |
| 62 | 190 | 254 | 158 | 222 |
| 61 | 221 | 157 | 253 | 189 |
| 60 | 156 | 220 | 188 | 252 |
| 59 | 187 | 251 | 155 | 219 |
| 58 | 250 | 186 | 218 | 154 |
| 57 | 153 | 217 | 185 | 249 |
| 56 | 216 | 152 | 248 | 184 |
| 55 | 215 | 151 | 247 | 183 |
| 54 | 150 | 214 | 182 | 246 |
| 53 | 245 | 181 | 213 | 149 |
| 52 | 180 | 244 | 148 | 212 |
| 51 | 147 | 211 | 179 | 243 |
| 50 | 210 | 146 | 242 | 178 |
| 49 | 177 | 241 | 145 | 209 |
| 48 | 240 | 176 | 208 | 144 |
| 47 | 175 | 239 | 143 | 207 |
| 46 | 238 | 174 | 206 | 142 |
| 45 | 141 | 205 | 173 | 237 |
| 44 | 204 | 140 | 236 | 172 |
| 43 | 235 | 171 | 203 | 139 |
| 42 | 170 | 234 | 138 | 202 |
| 41 | 201 | 137 | 233 | 169 |
| 40 | 136 | 200 | 168 | 232 |
| 39 | 135 | 199 | 167 | 231 |
| 38 | 198 | 134 | 230 | 166 |
| 37 | 165 | 229 | 133 | 197 |
| 36 | 228 | 164 | 196 | 132 |
| 35 | 195 | 131 | 227 | 163 |
| 34 | 130 | 194 | 162 | 226 |
| 33 | 225 | 161 | 193 | 129 |
| 32 | 160 | 224 | 128 | 192 |
| 31 | 95 | 31 | 127 | 63 |

FIG. 7a

| INTERNAL ADDRESS | BANK0 | BANK1 | BANK2 | BANK3 |
|---|---|---|---|---|
| 30 | 30 | 94 | 62 | 126 |
| 29 | 125 | 61 | 93 | 29 |
| 28 | 60 | 124 | 28 | 92 |
| 27 | 27 | 91 | 59 | 123 |
| 26 | 90 | 26 | 122 | 58 |
| 25 | 57 | 121 | 25 | 89 |
| 24 | 120 | 56 | 88 | 24 |
| 23 | 119 | 55 | 87 | 23 |
| 22 | 54 | 118 | 22 | 86 |
| 21 | 85 | 21 | 117 | 53 |
| 20 | 20 | 84 | 52 | 116 |
| 19 | 51 | 115 | 19 | 83 |
| 18 | 114 | 50 | 82 | 18 |
| 17 | 17 | 81 | 49 | 113 |
| 16 | 80 | 16 | 112 | 48 |
| 15 | 15 | 79 | 47 | 111 |
| 14 | 78 | 14 | 110 | 46 |
| 13 | 45 | 109 | 13 | 77 |
| 12 | 108 | 44 | 76 | 12 |
| 11 | 75 | 11 | 107 | 43 |
| 10 | 10 | 74 | 42 | 106 |
| 9 | 105 | 41 | 73 | 9 |
| 8 | 40 | 104 | 8 | 72 |
| 7 | 39 | 103 | 7 | 71 |
| 6 | 102 | 38 | 70 | 6 |
| 5 | 5 | 69 | 37 | 101 |
| 4 | 68 | 4 | 100 | 36 |
| 3 | 99 | 35 | 67 | 3 |
| 2 | 34 | 98 | 2 | 66 |
| 1 | 65 | 1 | 97 | 33 |
| 0 | 0 | 64 | 32 | 96 |

| INTERNAL ADDRESS | BANK0 | BANK1 | BANK2 | BANK3 | BANK4 | BANK5 | BANK6 | BANK7 |
|---|---|---|---|---|---|---|---|---|
| 30 | 350 | 286 | 478 | 414 | 94 | 30 | 222 | 158 |
| 29 | 413 | 477 | 285 | 349 | 157 | 21 | 29 | 93 |
| 28 | 476 | 412 | 348 | 284 | 220 | 56 | 92 | 28 |
| 27 | 27 | 91 | 155 | 219 | 283 | 347 | 411 | 475 |
| 26 | 90 | 26 | 218 | 154 | 346 | 282 | 474 | 410 |
| 25 | 153 | 217 | 25 | 89 | 409 | 473 | 281 | 345 |
| 24 | 216 | 152 | 88 | 24 | 472 | 408 | 344 | 280 |
| 23 | 343 | 279 | 471 | 407 | 87 | 23 | 215 | 151 |
| 22 | 278 | 342 | 406 | 470 | 22 | 86 | 150 | 214 |
| 21 | 469 | 405 | 341 | 277 | 213 | 149 | 85 | 21 |
| 20 | 404 | 468 | 276 | 340 | 148 | 212 | 20 | 84 |
| 19 | 83 | 19 | 211 | 147 | 339 | 275 | 467 | 403 |
| 18 | 18 | 82 | 146 | 210 | 274 | 338 | 402 | 466 |
| 17 | 209 | 145 | 81 | 17 | 465 | 401 | 337 | 273 |
| 16 | 144 | 208 | 16 | 80 | 400 | 464 | 272 | 336 |
| 15 | 399 | 463 | 271 | 335 | 143 | 207 | 15 | 79 |
| 14 | 462 | 398 | 334 | 270 | 206 | 142 | 78 | 14 |
| 13 | 269 | 333 | 397 | 461 | 13 | 77 | 141 | 205 |
| 12 | 332 | 268 | 460 | 396 | 76 | 12 | 204 | 140 |
| 11 | 139 | 203 | 11 | 75 | 395 | 459 | 267 | 331 |
| 10 | 202 | 138 | 74 | 10 | 458 | 394 | 330 | 266 |
| 9 | 9 | 73 | 137 | 201 | 265 | 329 | 393 | 457 |
| 8 | 72 | 8 | 200 | 136 | 328 | 264 | 456 | 392 |
| 7 | 455 | 391 | 327 | 263 | 199 | 135 | 71 | 7 |
| 6 | 390 | 454 | 262 | 326 | 134 | 198 | 6 | 70 |
| 5 | 325 | 261 | 453 | 389 | 69 | 5 | 197 | 133 |
| 4 | 260 | 324 | 388 | 452 | 4 | 68 | 132 | 196 |
| 3 | 195 | 131 | 67 | 3 | 451 | 387 | 323 | 259 |
| 2 | 130 | 194 | 2 | 66 | 386 | 450 | 258 | 322 |
| 1 | 65 | 1 | 193 | 129 | 321 | 257 | 449 | 385 |
| 0 | 0 | 64 | 128 | 192 | 256 | 320 | 384 | 448 |

FIG. 9a

| | | | | | | | | |
|---|---|---|---|---|---|---|---|---|
| 63 | 63 | 127 | 191 | 255 | 319 | 383 | 447 | 511 |
| 62 | 126 | 62 | 254 | 190 | 382 | 318 | 510 | 446 |
| 61 | 189 | 253 | 61 | 125 | 445 | 509 | 317 | 381 |
| 60 | 252 | 188 | 124 | 60 | 508 | 444 | 380 | 316 |
| 59 | 315 | 379 | 443 | 507 | 59 | 123 | 187 | 251 |
| 58 | 378 | 314 | 506 | 442 | 122 | 58 | 250 | 186 |
| 57 | 441 | 505 | 313 | 377 | 185 | 249 | 57 | 121 |
| 56 | 504 | 440 | 376 | 312 | 248 | 184 | 120 | 56 |
| 55 | 119 | 55 | 247 | 183 | 375 | 311 | 503 | 439 |
| 54 | 54 | 118 | 182 | 246 | 310 | 374 | 438 | 502 |
| 53 | 245 | 181 | 117 | 53 | 501 | 437 | 373 | 309 |
| 52 | 180 | 244 | 52 | 116 | 436 | 500 | 308 | 372 |
| 51 | 371 | 307 | 499 | 435 | 115 | 51 | 243 | 179 |
| 50 | 306 | 370 | 434 | 498 | 50 | 114 | 178 | 242 |
| 49 | 497 | 433 | 369 | 305 | 241 | 177 | 113 | 49 |
| 48 | 432 | 496 | 304 | 368 | 176 | 240 | 48 | 112 |
| 47 | 175 | 239 | 47 | 111 | 431 | 495 | 303 | 367 |
| 46 | 238 | 174 | 110 | 46 | 494 | 430 | 366 | 302 |
| 45 | 45 | 109 | 173 | 237 | 301 | 365 | 429 | 493 |
| 44 | 108 | 44 2 | 36 | 172 | 364 | 300 | 492 | 428 |
| 43 | 427 | 491 | 299 | 363 | 171 | 235 | 43 | 107 |
| 42 | 490 | 426 | 362 | 298 | 234 | 170 | 106 | 42 |
| 41 | 297 | 361 | 425 | 489 | 41 | 105 | 169 | 233 |
| 40 | 360 | 296 | 488 | 424 | 104 | 40 | 232 | 168 |
| 39 | 231 | 167 | 103 | 39 | 487 | 423 | 359 | 295 |
| 38 | 166 | 230 | 38 | 102 | 422 | 486 | 294 | 358 |
| 37 | 101 | 37 | 229 | 165 | 357 | 293 | 485 | 421 |
| 36 | 36 | 100 | 164 | 228 | 292 | 356 | 420 | 484 |
| 35 | 483 | 419 | 355 | 291 | 227 | 163 | 99 | 35 |
| 34 | 418 | 482 | 290 | 354 | 162 | 226 | 34 | 98 |
| 33 | 353 | 289 | 481 | 417 | 97 | 33 | 225 | 161 |
| 32 | 288 | 352 | 416 | 480 | 32 | 96 | 160 | 224 |
| 31 | 287 | 351 | 415 | 479 | 31 | 95 | 159 | 223 |

PROGRAMMABLE MEMORY MAPPING SCHEME WITH INTERLEAVE PROPERTIES

BACKGROUND

The invention relates generally to addressing of memory locations, and specifically to a method for mapping an address for memory access in a memory system.

Memory systems have a growing impact on overall computer system performance and power efficiency. Maximizing the utilization of the available memory resources is therefore a key target of many research projects these days. One aspect that has been targeted already for a long time is to improve the memory system performance for workloads that involve access patterns based on power-of-2 strides in the used address sequences. These are, e.g., workloads that access a data structure that is mapped on the linear virtual (and also physical) address space, by addresses with an increment of 1 (e.g., 0, 1, 2, 3, etc.), 8 (e.g., 0, 8, 16, 24, etc.), or 256 (e.g., 256, 512, 768, 1024, etc.) and so on. Despite that this type of access has been investigated for a long time, the issue of inefficient access is still not solved. One problem is that this kind of power-of-2 stride access often results in degraded memory performance due to the organization and standard address mapping used in many memory systems, which are often organized using a power-of-2 number of memory banks. In special HPC (high performance computing) systems, sometimes fixed/hard-wire mappings are used that are based on performing a modulo operation against a prime number or similar approaches, which are difficult to program and still can result in worst-case/pathological cases. The latter mechanisms also add to the access latency. One example of a workload that involves many accesses to the same data structure using a wide variety of power-of-2 strides is the Fast Fourier Transform (FFT), which is considered one of the most important algorithms in signal processing and is also one of the most published algorithms in literature. It allows efficient conversions of a sampled function from the time domain to the frequency domain and vice versa, which are essential for a wide range of applications, including image processing (including recognition), and radio astronomy, and many more.

SUMMARY

According to one embodiment of the present invention, a method for mapping an address for memory access in a memory system may be provided. The method may be adapted for mapping an address for memory access in a memory system into a combination comprising a memory bank identifier and a memory bank internal address indicative of an address within the memory bank. The memory system may be adapted for storing data in a plurality of memory banks in an interleaved fashion. The method may comprise partitioning the address for memory access into a first portion, a second portion and a third portion and determining the memory bank identifier as output of a look-up operation in a look-up matrix using as a first input the first portion of the address for memory access. The method may further comprise using as at least two further inputs for the look-up operation in the look-up matrix results of parity functions applied to the second and the third portion, and deriving the memory bank internal address based on the second portion and third portion the address for memory access address.

According to another embodiment of the present invention, an address mapping system for mapping an address for memory access in a memory system may be provided. The address mapping system for mapping an address for memory access in a memory system into a combination may comprise a memory bank identifier and a memory bank internal address indicative of an address within the memory bank. The memory system being adapted for storing data in a plurality of memory banks in an interleaved fashion. The address mapping system may comprise a partitioning module adapted for partitioning the address for memory access into a first portion, a second portion and a third portion, and a determining module adapted for determining the memory bank identifier as output of a look-up operation in a look-up matrix using as a first input the first portion of the address for memory access. The address mapping system may further comprise a look-up module adapted for using as at least two further inputs for the look-up operation in the look-up matrix results of parity functions applied to the second and the third portion, and address module adapted for deriving the memory bank internal address based on the second portion and third portion the address for memory access address.

According to another embodiment of the present invention a computer program product for memory access in a memory system may be provided. The computer program product for memory access in a memory system into a combination may comprise a memory bank identifier and a memory bank internal address indicative of an address within the memory bank. The memory system being adapted for storing data in a plurality of memory banks in an interleaved fashion. The computer program product may comprise a computer readable storage medium having program instructions embodied therewith. The program instructions may be executable by a computer to cause the computer to partition the address for memory access into a first portion, a second portion and a third portion, and determine the memory bank identifier as output of a look-up operation in a look-up matrix using as a first input the first portion of the address for memory access. The program instructions may also cause the computer to use as at least two further inputs for the look-up operation in the look-up matrix results of parity functions applied to the second and the third portion, and derive the memory bank internal address based on the second portion and third portion of the address for memory access.

Furthermore, embodiments may take the form of a computer program product, accessible from a computer-usable or computer-readable medium providing program code for use, by or in connection with a computer or any instruction execution system. For the purpose of this description, a computer-usable or computer-readable medium may be any apparatus that may contain means for storing, communicating, propagating or transporting the program for use, by or in a connection with the instruction execution system, apparatus, or device.

BRIEF DESCRIPTION OF THE SEVERAL VIEWS OF THE DRAWINGS

It should be noted that embodiments of the invention are described with reference to different subject-matters. In particular, some embodiments have been described with reference to method type claims whereas other embodiments have been described with reference to apparatus type claims. However, a person skilled in the art will gather from the above and the following description that, unless otherwise notified, in addition to any combination of features belonging to one type of subject-matter, any combination between features relating to different subject-matters, in particular, between features of the method type claims, and features of the apparatus type claims, is considered as to be disclosed within this document.

The aspects defined above and further aspects of the present invention are apparent from the examples of embodiments to be described hereinafter and are explained with reference to the examples of embodiments, but to which the invention is not limited.

Preferred embodiments of the invention will be described, by way of example only, and with reference to the following drawings.

DETAILED DESCRIPTION

In the context of this description, the following conventions, terms and/or expressions may be used:

The term 'address' may denote a location for storing data in a memory system, e.g., a random access memory (RAM) with individual memory cells. In these memory cells, data, typically data words, may be stored.

The term 'memory system' may denote a device for storing data in an electronic or magnetic fashion, e.g., a semiconductor memory. The memory system may be organized in blocks or banks of memory cells. Typically, a memory system may include driver circuits, addressing logic, refresh logic, and other supporting elements to access individual memory cells.

The term 'memory bank identifier' may denote a code that may identify an individual block of memory cells. Several memory blocks, each comprising a plurality of memory cells, may exist in a larger memory system.

The term 'memory bank internal address' may denote an address of a single memory cell within a memory bank. Thus, identical memory bank internal addresses may belong to different memory banks having different memory bank identifiers and may address different memory cells.

The term 'interleaved fashion' may denote that memory cells with directly successive addresses may not be located on the same memory bank but pair-wise on different memory banks. Thus, a memory cell, related to a first memory address, may be located on a different memory bank if compared to a memory cell related to a second memory address wherein the first and the second address differ by one bit.

The term 'look-up matrix' may denote a matrix being instrumental when accessing memory cells having memory addresses. The address in question may not be used directly to address and access a memory cell. Firstly, a portion of the memory cell address may be used to address a field in a look-up table. The content of the so identified field in the table may be used as, e.g. an offset within the memory system, or, preferably, as a bank select indication.

The term 'parity functions' may denote a function adapted for determining a parity of a data value, e.g., an address value. In Boolean algebra, a parity function is a Boolean function whose value is 1 if, and only if, the input vector has an odd number of ones. Thus, if the input vector has an even number of ones or none the parity function returns a 0.

It may be noted that the term "address for memory access" used throughout this document may also denote a line address in accordance with usual terminology. Thus, the terms "address for memory access" and "line address" may be used interchangeably.

Embodiments of the proposed method for mapping an address for memory access in a memory system may offer one or more advantages: Any number of memory banks may be selected and not only a number of memory banks equals a power-of-2. Also, the addressing schema is flexible and programmable depending on the calculation type to be solved. This may even be changed during a regular operation of a computer system if the calculation type changes. Thus, an optimal performance may be achieved without manually reconfiguring any hardware settings. Embodiments of the proposed method may be implemented in hardware or software or a mixture of both, thus, optimizing the functionality of the computer hardware, and in particular, the related memory system "on the fly". The bandwidth may be used to its maximum capacity even under different workloads and calculation types.

Embodiments of the proposed method may allow an easy implementation of a memory address system being able to support a number of memory banks that is not equal to the power-of-2. Known memory bank concepts typically rely on a number of memory banks that has to be a power-of-2.

According to one embodiment of the method, the partitioning may comprise partitioning the address for memory access into the first portion, the second portion, the third portion and, a fourth partition. More partitions may also be used for a more fine-grained addressing scheme.

According to an embodiment of the method, the look-up matrix may be programmable. Thus, the addressing scheme may be fully flexible and adaptable to data and functions to be processed, e.g., FFT calculation.

According to a further embodiment of the method, the number of memory banks may equal a power-of-2. According to an alternative embodiment of the method, the number of memory banks may not equal to a power-of-2. Thus, any number of memory banks may advantageously be supported.

In one advantageous embodiment of the method, a row selection of the look-up matrix may be based on the first portion of the address for memory access. Furthermore, in one embodiment or in combination with the just described embodiment of the method, a column selection of the look-up matrix may be based on the parity functions of second and third portions of the address for memory access.

This may allow for a fully flexible addressing schema using look-up matrices instead of simple one dimensional look-up tables.

According to one advantageous embodiment of the method, the second portion of the address for memory access may comprise every odd bit of the address for memory access, wherein the first portion may not be considered. According to one additional embodiment of the method—and potentially in combination with the just described embodiment—the third portion of the address for memory access may comprise every even bit of the address for memory access, wherein the first portion may not be considered. Other selection criteria may be possible, as FIG. 8 of this disclosure suggests where 3 parity functions are used.

According to one preferred embodiment of the method, a determination of the second and third portion of the address for memory access may be based on entries in a mask table. A hardware implementation may easily be achieved. Hence, in one further embodiment of the method, the mask table may be implemented as a mask register. This may allow over-proportionally fast address mapping schemas.

In the following, a detailed description of the figures will be given. All instructions in the figures are schematic. Firstly, a block diagram of an embodiment of the inventive method for mapping an address for memory access in a memory system is given. Afterwards, further embodiments as well as embodiments of the address mapping system for mapping an address for memory access in a memory system will be described.

Figure 1:
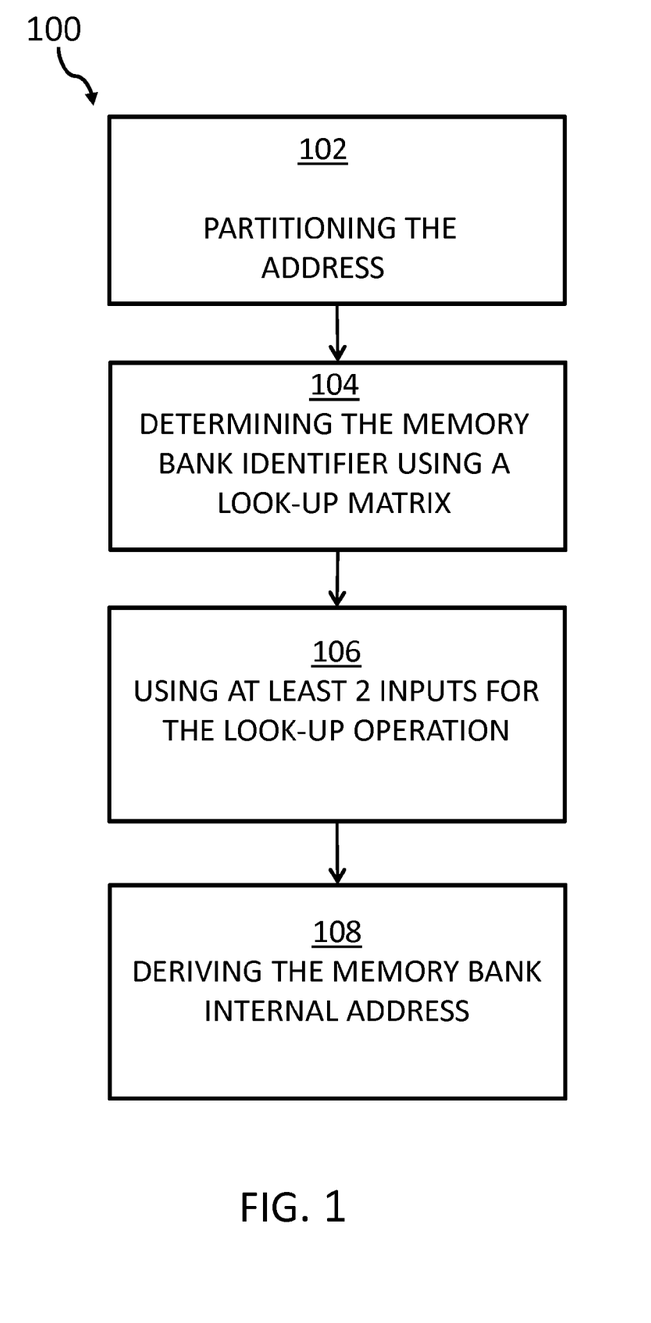
FIG. 1 shows a block diagram of the inventive method for mapping an address for memory access in a memory system.

FIG. 1 shows a block diagram 100 of an embodiment of the method for mapping an address for memory access in a memory system into a combination comprising a memory bank identifier and a memory bank internal address. The memory bank internal address may be indicative of an address within the memory bank. The memory system may be adapted for storing data in a plurality of memory banks in an interleaved fashion. The method comprises partitioning, 102, the address for memory access into a first portion, a second portion and a third portion. The portions may be non-overlapping and all three portions may build together the complete address for a memory access.

The method comprises further determining, 104, the memory bank identifier as output of a look-up operation in a look-up matrix using as a first input the first portion of the address for memory access, and using, 106, as at least two further inputs for the look-up operation in the look-up matrix results of parity functions applied to the second and the third portion. Additionally, the method comprises deriving, 108, the memory bank internal address based on the second portion and third portion of the address for memory access.

Figure 2:
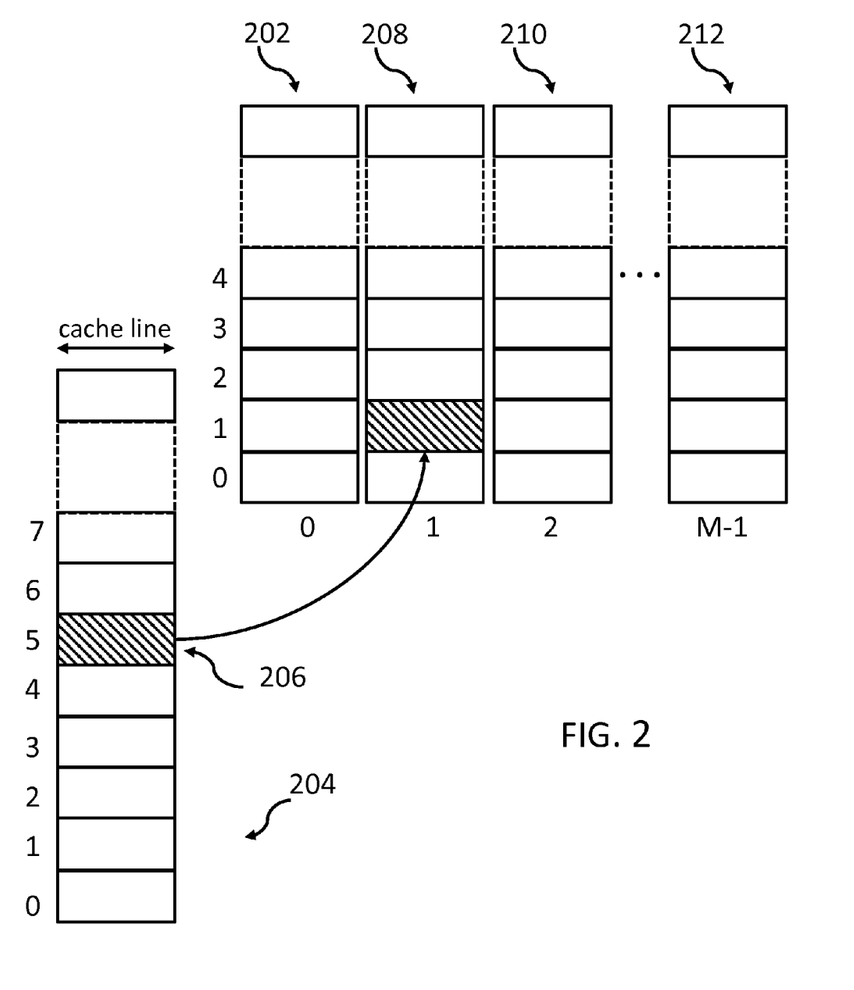
FIG. 2 shows a block diagram of an embodiment of an address mapping schema using memory banks.

FIG. 2 shows a block diagram of an embodiment of an address mapping schema using memory banks. A cache line 204 may represent a physical address space of the memory of a computer system indicated by cache line entry numbers 0, . . . , 7, etc. On the other side, a series of memory banks 202, 208, 210, 212 having numbers 0, 1, 2, . . . , M−1 with memory cell entries 0, . . . , 4, etc. may represent how memory cells may be organized in memory banks 202. A physical address, e.g., cache line entry 206, may point to the second memory cell—having an index number of 1—in the second memory bank—having a memory bank number of 1. Thus, the cache line entries point finally to different memory banks 202.

Figure 3:
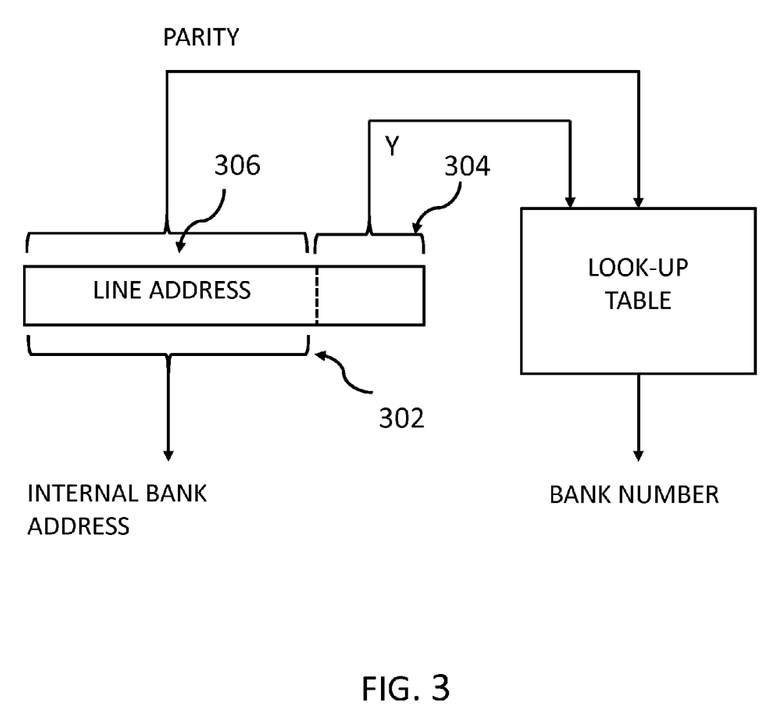
FIG. 3 shows a block diagram of an address mapping schema using memory banks addressed by a simple look-up table.

FIG. 3 shows a block diagram of an address mapping schema using memory banks addressed by a simple look-up table. This example divides a physical address or line address 302 into a Y-part 304 and a memory bank internal address 306 or internal bank address 306. A look-up table is used to identify the right bank number to be accessed with the internal bank address. As input for the look-up table the Y-part 304 and a parity of the remaining part of the line address 302 which is equal to the memory bank internal address 306 are used.

Figure 4:
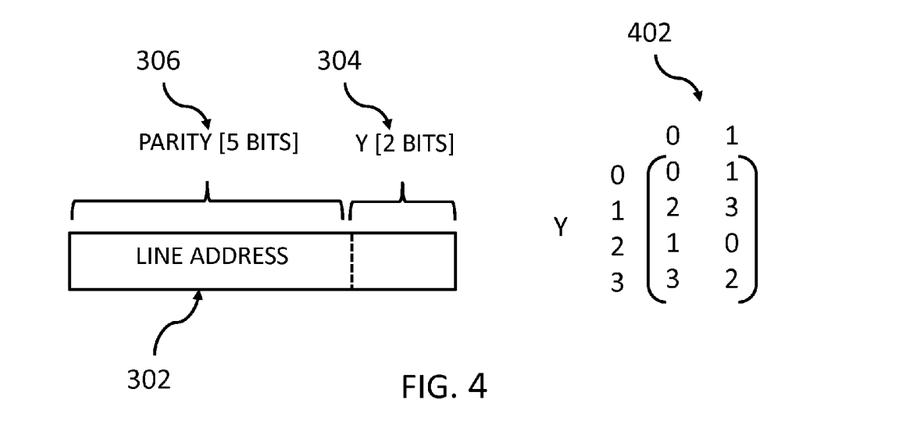
FIG. 4 shows a diagram of an example of how the address mapping schema of FIG. 3 may be implemented.

FIG. 4 shows a diagram of an example of how the address mapping schema of FIG. 3 may be implemented. Here, a two bit Y-part 304 and a 5-bit memory bank internal address are used. Thus, the complete line address 302 is seven bits wide. The look-up table 402 shows how individual memory banks are selected using the white part 304 of the line address 302 and the result of a parity function executed on the 5-bit internal bank address. The look-up table 402 has four rows representing the four different statuses 0, 1, 2, and 3 of the two Y-bits 304. The columns of the look-up table 402 represent the result of the parity function. As an example, memory bank 3 may be selected, if the Y-part 304 represents a decimal 1 and the parity function equals 1. In another example, memory bank 1 may be selected if the Y-part 304 represents a decimal 2 (binary 10) and the parity function yields 0.

Figure 5:
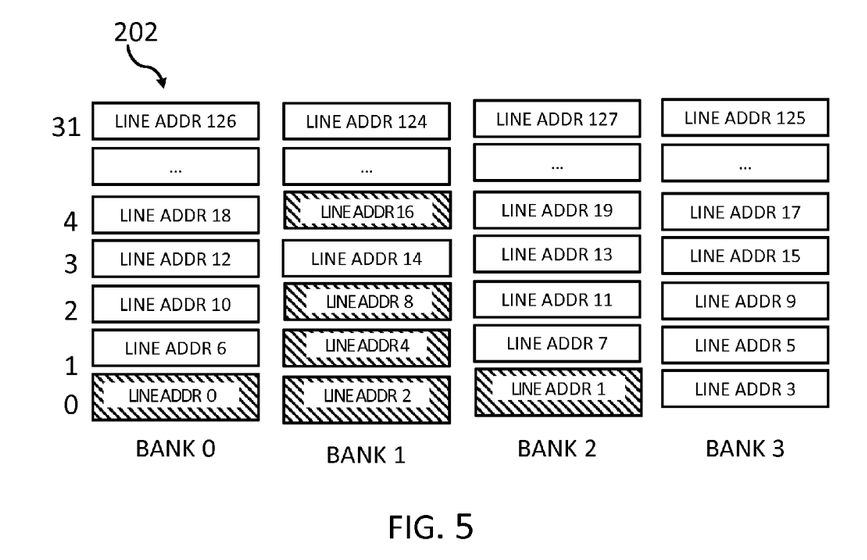
FIG. 5 shows memory cells addressed by the schema detailed in respect to FIG. 4.

FIG. 5 shows memory cells addressed by the schema detailed in respect to FIG. 4. The graphic shows that line address 0 (lineaddr0) is mapped to memory bank 0, 202. Line address 1 (lineaddr1) is mapped to memory bank 2, 210. Line address 2 (lineaddr2) is mapped to memory bank 1, 208 and so on. However, if memory cells may be accessed with an address sequence involving a the power-of-2 stride equal to or larger than 4, most of these address sequences—e.g., lineaddr0, lineaddr2, lineaddr6 involving a stride 2, or an address sequence lineaddr0, lineaddr4, lineaddr8, lineaddr12 involving a stride 4—are mapped over only two different memory banks (e.g., memory bank 0, 202, and memory bank 1, 208). As discussed above, this utilize the available memory bandwidth provided by all banks, and consequently may cause performance degradations due to increased latency caused by bank contention because the accesses are not nicely distributed. However, it seems to be impossible to come up with a mapping of the line address 302 to memory banks 202, 208, 210, 212, etc., using the simple look-up table 402 that interleaves address sequences involving different power-of-2 strides over all available memory banks, and consequently minimized the bank contention.

Figure 6:
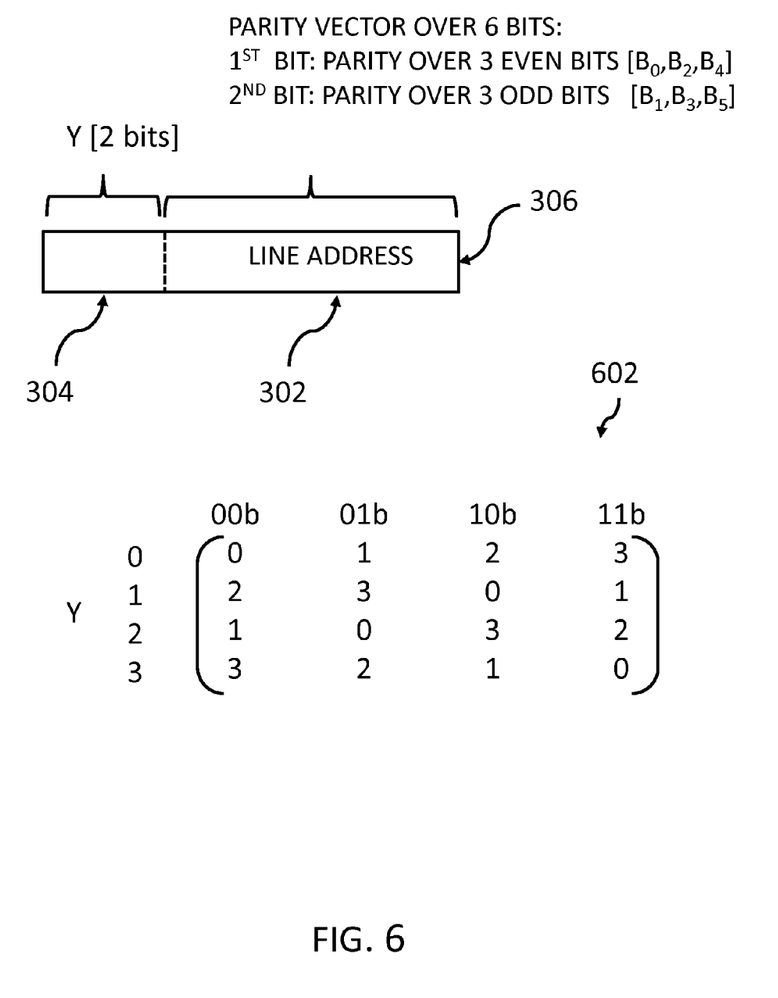
FIG. 6 shows a block diagram of elements used by the inventive method for mapping an address for memory access in a memory system.

FIG. 6 shows a block diagram of elements used by the inventive method 100 for mapping an address for memory access in a memory system. Here, the line address is again divided into two parts: a Y-part or first portion 304 comprising, e.g., 2 bits, and the remaining part representing the internal memory bank internal address 306. However, the memory bank internal address 306 is again divided into 2 portions. In this case, an 8-bit line address may be used. Hence, the memory bank internal address 306 is 6 bits long. A first parity function may be applied over the 3 even bits [b0, b2, b4] of the memory bank internal address part 306 of the line address 302. A second parity function may be applied over the 3 odd bits [b1, b3, b5] of the memory bank internal address part 306 of the line address 302. Hence, not a single, simple parity bit is used for a look-up table, but a parity vector for a look-up matrix. These components may now be used to determine the memory bank within a look-up matrix 602. The rows of the look-up table 602 are built in the same way, as described in the context of FIG. 4. A difference lies in the construction of the column selection in the look-up matrix 602. This more complex scheme allows for a much better distribution of memory accesses to memory cells within different memory banks. If, e.g., both above-mentioned parity functions yield each "0" and the Y-part 304 may also "0" then the top left entry "0" in the look-up matrix 602 may be used as bank select signal. The character "b" may represent that the column select signals are expressed as binary variables. In another example, the first parity function may yield "1" over the 3 even bits of the memory bank internal address 306, the second parity function may yield "0" over the 3 odd bits of the memory bank internal address 306, and the Y-part 304 may represent a "2", for then the memory bank 3, 210 may be selected.

It may be noted that as the Y-portion 304 any portion or part of the line address 302 may be used. Restrictions to the beginning or the end of the line address 302 may not exist. The bits selected from the line address 302 representing the first portion also do not have to be consecutive within the line address 302. Any bits may be combined to form the Y-portion 304.

It may be noted—according to FIG. 6—that address sequences involving a stride 25=32 are perfectly interleaved over all memory banks due to the Y vector index: for example, the address sequence 0, 32, 64 and 96 are mapped to memory banks 0, 2, 1, and 3. These addresses have a common bank internal address 306 and different Y vectors. This results in an identical parity vector 00b for these addresses, which therefore, will be mapped according to the first matrix column corresponding to the common parity bits 00b. The next address block with this stride, namely 1, 33, 65 and 97, is mapped in a similar fashion over banks 1, 3, 0 and 2, according to second matrix column corresponding to the identical parity bits 01b.

A novel thing in this case, however, is that now address groups comprised of 4 addresses (this is due to the use of a parity vector comprised of 2 bits—with 22=4) involving any power-of-2 stride up to and including 16 and aligned "according to an FFT radix-4 butterfly operand boundary" are perfectly interleaved over all 4 banks, which consequently reduces bank contention.

First Examples

TABLE 1

| address sequences | mapped banks |
|---|---|
| 0, 1, 2, 3 (stride 1) | 0, 1, 2, 3 |
| 0, 2, 4, 6 (stride 2) | 0, 2, 1, 3 |
| 0, 4, 8, 12 (stride 4) | 0, 1, 2, 3 |
| 0, 8, 16, 24 (stride 8) | 0, 2, 1, 3 |
| 0, 16, 32, 48 (stride 16) | 0, 1, 2, 3 |
| 0, 32, 64, 96 (stride 32) | 0, 2, 1, 3 |

It may be noted that each memory bank identifier occurs only once for the sequences listed here. The above addresses are marked as striped in FIGS. 7a and 7b.

Another example is:

TABLE 2

| address sequences | mapped banks |
|---|---|
| 4, 5, 6, 7 (stride 1) | 1, 0, 3, 2 |
| 16, 18, 20, 22 (stride 2) | 1, 3, 0, 2 |
| 79, 95, 111, 127 (stride 16) | 1, 0, 3, 2 |
| 115, 119, 123, 127 (stride 4) | 1, 0, 3, 2 |
| 103, 111, 119, 127 (stride 8) | 1, 3, 0, 2 |

Because, the mapping schema is based on a lookup matrix, it very flexible and programmable for different calculation methods involving different types of sequences of memory cells accessed.

Figure 7A:
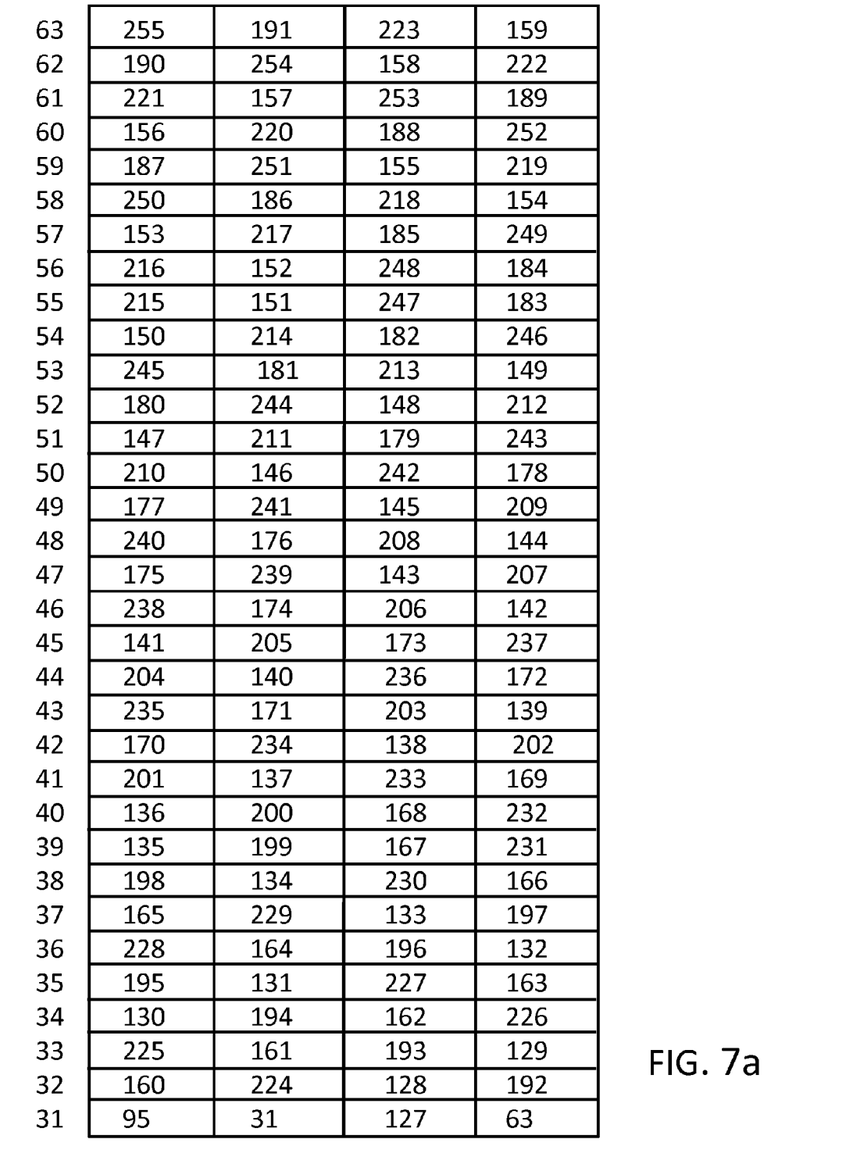
FIGS. 7a and 7b show memory cells addressed by the schema detailed in respect to FIG. 6.
Figure 7B:
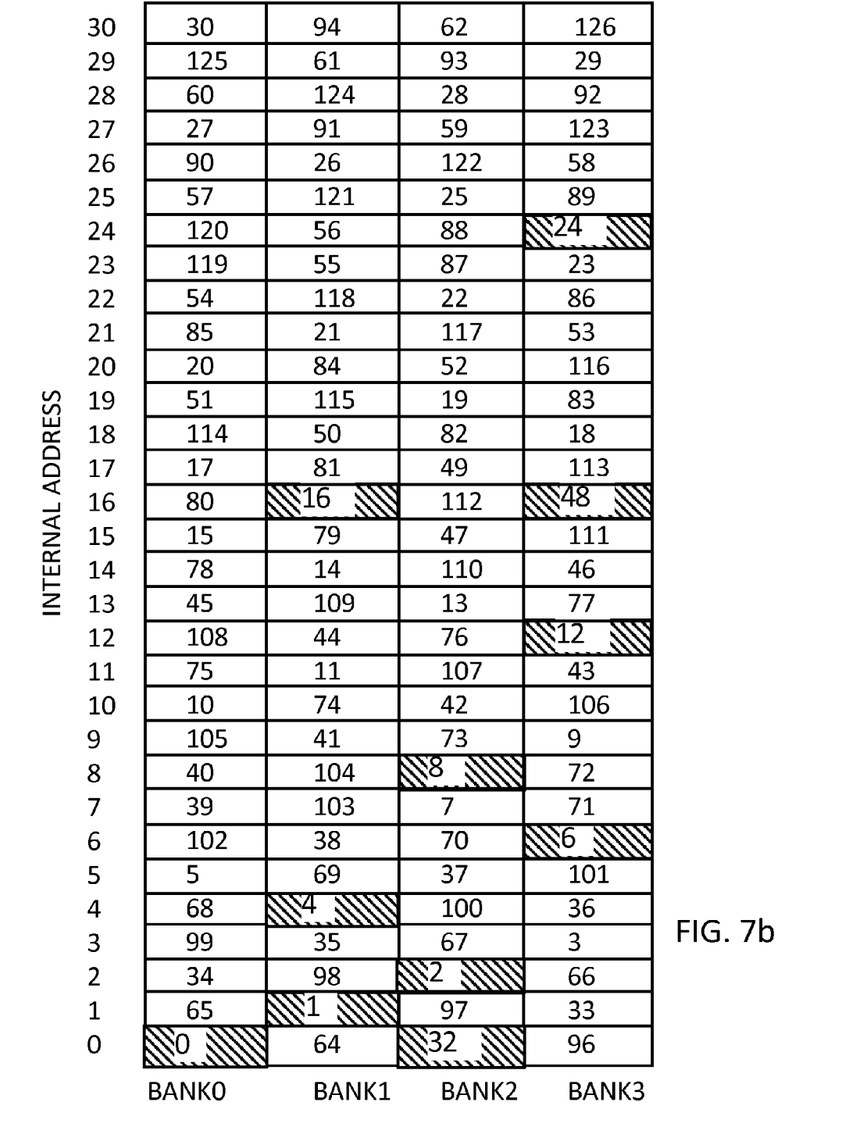

FIG. 7a, FIG. 7b show memory cells 0 to 63 addressed by the schema detailed in respect to FIG. 6. According to the memory bank internal address 306, which comprises 6 bits, each memory bank (memory bank 0, 202, memory bank 1, 208, memory bank 2, 210, memory bank 3, 212) may comprise 64 memory cells having internal addresses from 0 to 63. Striped entries in the memory banks 0, 1, 2, 3 show a much better distribution of memory cells among memory banks if the memory cell addresses follow a power-of-2 schema. As a consequence, the memory bandwidth of a computer system, in particular for calculations in which memory cells are addressed using multiple different power-of-2 strides like in FFT (Fast Fourier Transformation) calculations, is much better utilized, resulting in less bank contention. Thus, the performance of the underlying computer system is increased if compared to a traditional addressing scheme involving memory banks.

Figure 8:
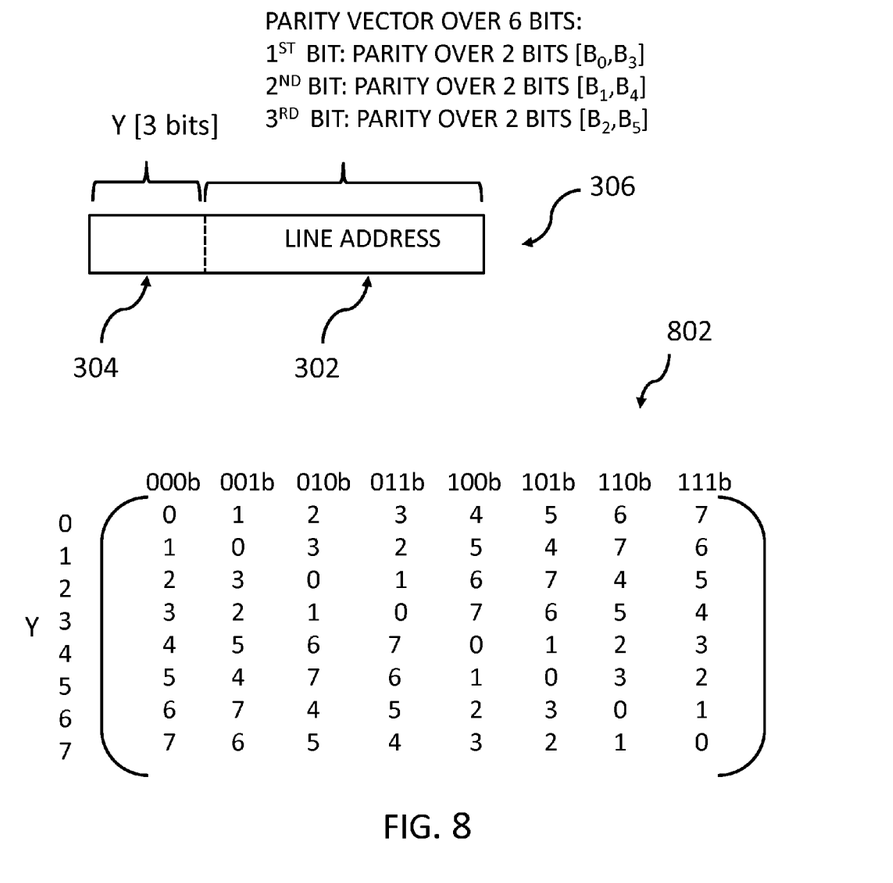
FIG. 8 shows a diagram in which 3 parity functions are executed on the memory bank internal address for memory cells and resulting look-up matrix.

FIG. 8 shows a diagram in which 3 parity functions are executed on the memory bank internal address 306 of memory cells and the required look-up matrix 802. In this example, the line address of 302 is divided in 4 portions. The Y-part 304 comprises 3 bits. Additionally, three parity functions are executed over the 3 remaining portions representing the memory bank internal address 306 of the line address 302. The first parity function is executed over 2 bits [b0, b3] of the memory bank internal address 306. A second parity function is executed over the 2 bits [b1, b4], and a third parity function is executed over the two parity bits [b2, b5]. A corresponding look-up matrix 802 is shown in the bottom part of FIG. 8. This becomes now an 8×8 matrix derived from 3 bits of the Y-part 304 of the line address, represented by 0, 1, 2, 3, . . . 7, and 8 possible combinations of the three outcomes of the three parity functions over the three remaining portions of the line address 306. It may be noted that the memory bank internal address 306 may be used unchanged within a memory bank 202, 208, 210, 212 after the right memory bank may have been selected.

Figure 9A:
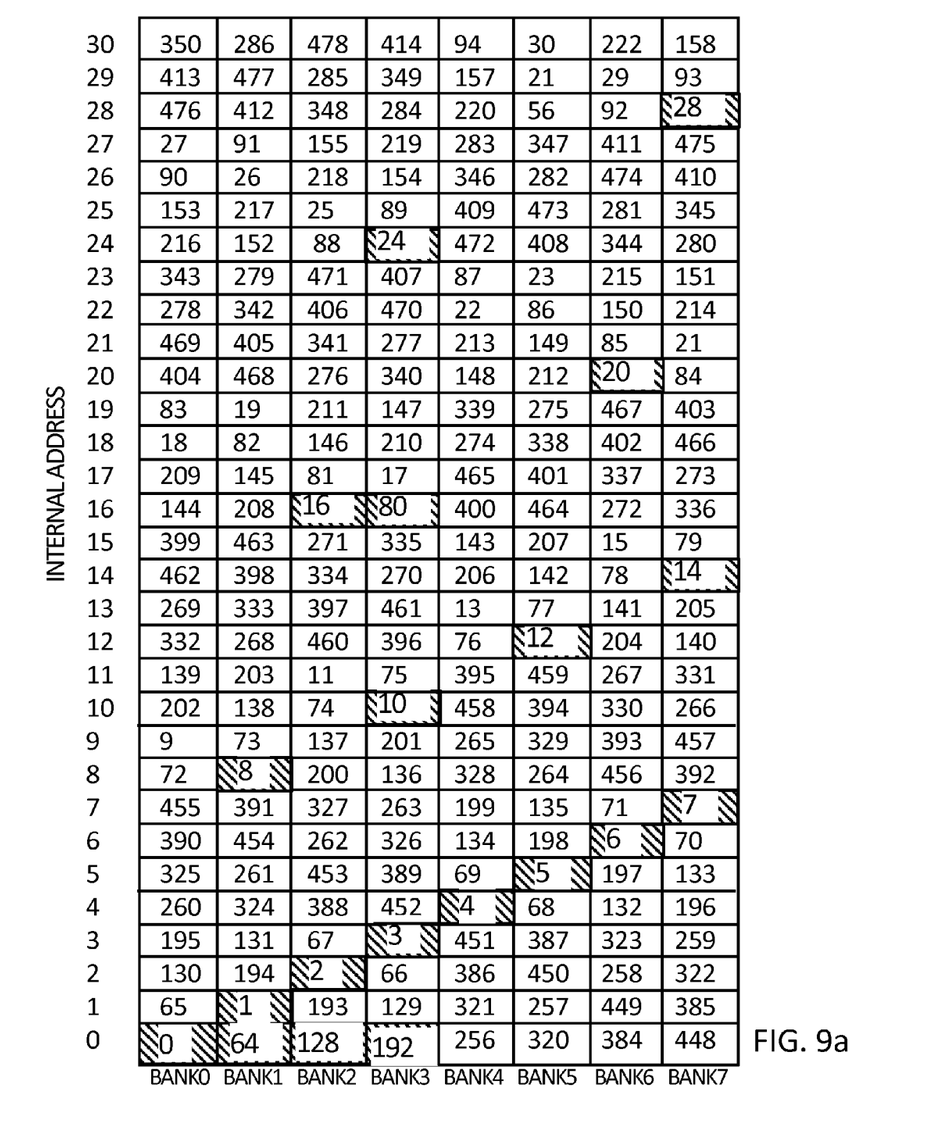
FIGS. 9a and 9b show memory cells addressed by the schema detailed in respect to FIG. 6.
Figure 9B:
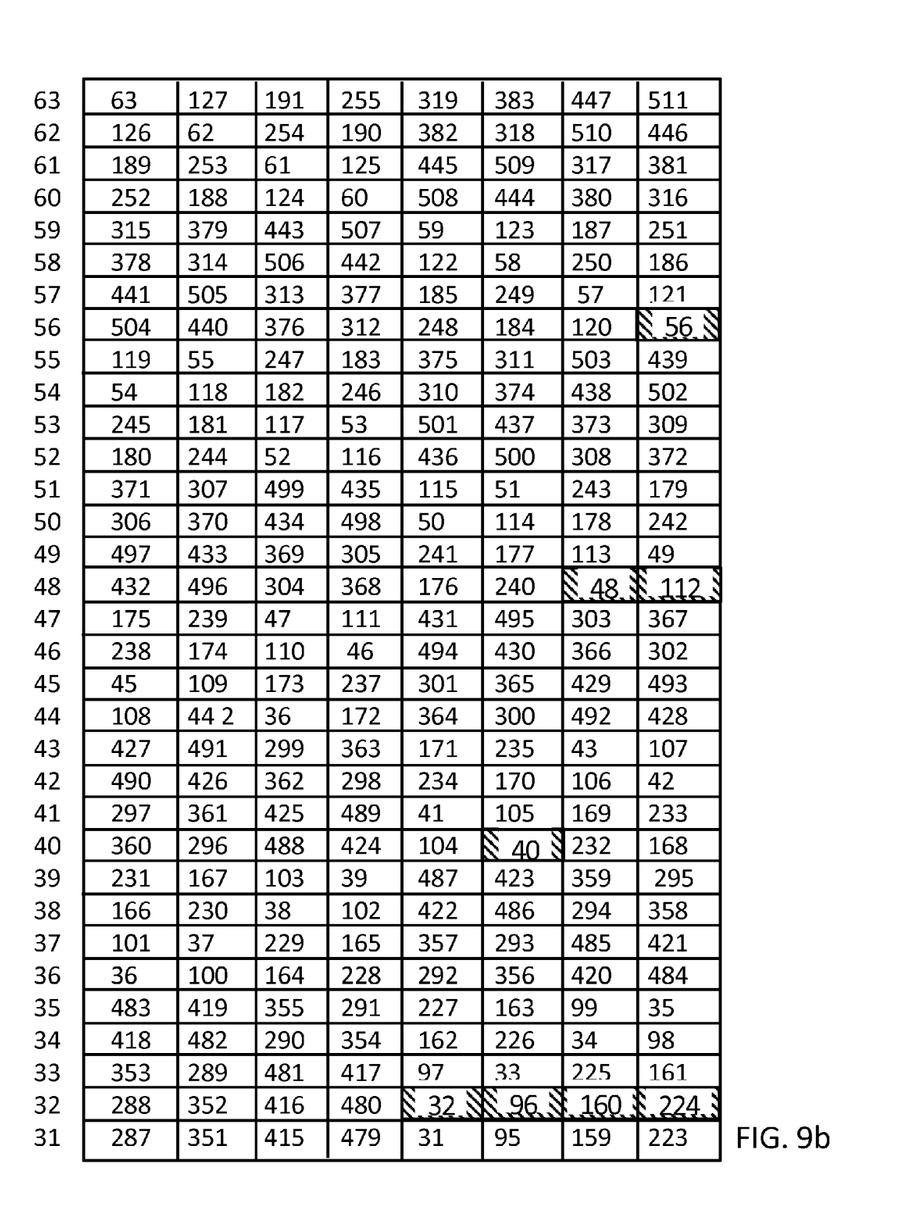

Hence, the same as discussed in the context of FIG. 6 may be used for longer address sequences. The same concept can be used to map longer address sequences over a larger number of memory banks. FIGS. 9a and 9b illustrate a full interleaving of address sequences involving multiple power-of-2 strides having sequence lengths equal to 8 over 8 banks. Instead of using a 2-bit parity vector, now a 3-bit parity vector is used and the segment in the line address over which the parity values are calculated is divided into three interleaved sub-vectors over which each of the parity vector bits is calculated similar as described above (see FIG. 8). Examples of how various power-of-2 stride access sequences are interleaved:

TABLE 3

| address sequences | mapped banks |
|---|---|
| 0, 1, 2, 3, 4, 5, 6, 7 (stride 1) | 0, 1, 2, 3, 4, 5, 6, 7 |
| 0, 2, 4, 6, 8, 10, 12, 14 (stride 2) | 0, 2, 4, 6, 1, 3, 5, 7 |
| 0, 4, 8, 12, 16, 20, 24, 28 (stride 4) | 0, 4, 1, 5, 2, 6, 3, 7 |
| 0, 8, 16, 24, 32, 40, 48, 56 (stride 8) | 0, 1, 2, 3, 4, 5, 6, 7 |
| 0, 16, 32, 48, 64, 80, 96, 112 (stride 16) | 0, 2, 4, 6, 1, 3, 5, 7 |
| 0, 32, 64, 96, 128, 160, 192, 224 (stride 32) | 0, 4, 1, 5, 2, 6, 3, 7 |
| 0, 64, 128, 192, 256, 320, 384, 448 (stride 64) | 0, 1, 2, 3, 4, 5, 6, 7 |

The above addresses are marked as striped in FIGS. 9a and 9b.

Although the concept as described above fully defines the mapping scheme, in addition, the way in which the look-up matrix contents can be derived maybe looked at here: e.g., to prevent conflicts, each row and each column of the look-up matrix may only contain one particular memory bank identifier exactly once. To achieve a perfect interleaving for multiple power-of-2 stride access sequences, the first column of the matrix may be filled with all memory bank identifiers in sequence, e.g., 0, 1, 2, 3 in FIG. 6 and 0, 1, 2, 3, 4, 5, 6, 7 in FIG. 8.

Next, the power-of-2 address sequences that "cross" the Y-part/parity segment boundaries are considered: for example, for FIGS. 8, 9a, and 9b, the following sequences are considered, and assigned unique memory bank identifiers "on the fly" during processing:

TABLE 4

| (stride 32) | [x, y] | bank id. | (stride 16) | [x, y] | bank id. |
|---|---|---|---|---|---|
| 0 | [0, 0] | 0 | 0 | [0, 0] | 0 |
| 32 | [4, 0] | 4 | 16 | [2, 0] | 2 |
| 64 | [0, 1] | 1 | 32 | [4, 0] | 4 |
| 96 | [4, 1] | 5 | 48 | [6, 0] | 6 |
| 128 | [0, 2] | 2 | 64 | [0, 1] | 1 |
| 160 | [4, 2] | 6 | 80 | [2, 1] | 3 |
| 192 | [0, 3] | 3 | 96 | [4, 1] | 5 |
| 224 | [4, 3] | 7 | 112 | [6, 1] | 7 |

This process may simply be repeated for various address sequences and strides until all matrix elements have been assigned. This actually may be a simple regular approach to fill the matrices while solving a range of conditions related to the distribution of addresses over multiple memory banks with this distribution being dependent on the matrix elements. An alternative approach to derive the lookup-matrix contents, is to assign each element the bit-wise XOR product of the X and Y values that are used to index that element. This is for example applied in FIG. 8.

A noticeable feature of the mapping is that the above-described properties are achieved using a complete mapping that maps all available memory locations in contrast to methods that leave holes in the address sequences. Another noticeable feature is that the mapping is programmable: the lookup table (the matrices in FIGS. 6 and 8) may be modifiable to create different mappings. Furthermore, the Y-part 304 vector may be moved to any other position as part of the line address (e.g., in a hardware implementation using multiplexers, in a software implementation using a shift/mask instruction).

Also, the bits over which the individual parity vector bits are calculated may be selected using mask vectors that may be programmed into configuration registers.

FIGS. 9a and 9b shows memory cells addressed by the schema detailed in respect to FIG. 8. Again, 8 memory banks 0, . . . , 7 having 64 memory cells each are used. Also here, it can easily be seen that the distribution memory cells having addresses in a sequence of power-of-2 is even better if compared to a schema using only 2 parity functions. The proposed look-up matrix schema also allows for a number of memory banks 202, 208, 210, 212 not equal a power-of-2. This gives much better flexibility in the design and the performance of a memory system using the memory bank concept. Also here striped memory cells show the power-of-2 access schema often used on FFT calculations.

Figure 10:
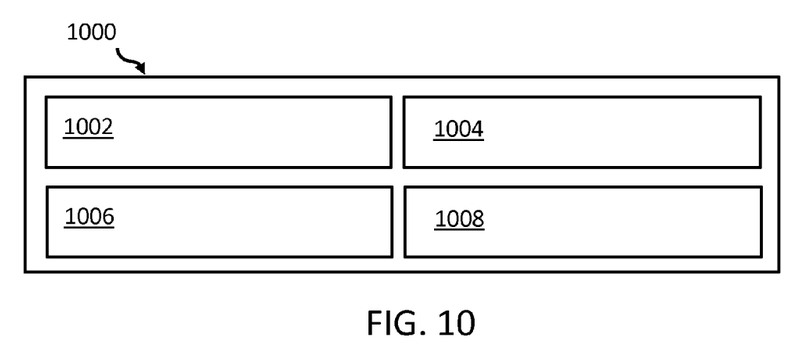
FIG. 10 shows a block diagram of the inventive address mapping system.

FIG. 10 shows an address mapping system 1000 for mapping an address for memory access in the memory system into a combination of a memory bank identifier 302 and a memory bank internal address 306. The memory bank internal address 306 is indicative of an address within the memory bank 202, 208, 210, 212. The memory system is adapted for storing data in a plurality of memory banks 202, 208, 210, 212 in an interleaved fashion. The address mapping system 1000 comprises a partitioning module 1002 adapted for partitioning the address for memory access into a first portion, i.e., the Y-portion, a second portion and a third portion. The address mapping system 1000 may also comprise a determining module 1004 adapted for determining the memory bank identifier as output of a look-up operation in a look-up matrix using as a first input the first portion 302 of the address from a memory access, and a look-up module 1006 adapted for using as at least two further inputs for the look-up operation in the look-up matrix results of parity functions applied to the second and the third portion of the line address. Moreover, the address mapping system 1000 also comprises an address module 1008 adapted for deriving the memory bank address based on the second portion and the third portion of the address for memory access.

Figure 11:
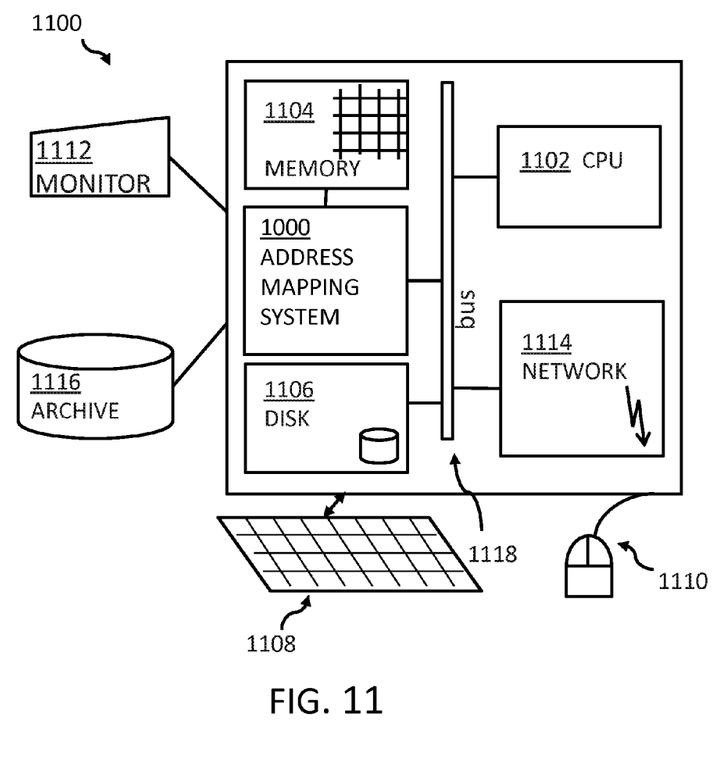
FIG. 11 shows a block diagram of a computer system comprising the address mapping system according to FIG. 10.

Embodiments of the invention may be implemented together with virtually any type of computer, regardless of the platform being suitable for storing and/or executing program code. For example, as shown in FIG. 11 a computing system 1100 may include one or more processor(s) 1102 with one or more cores per processor, associated memory elements 1104, an internal storage device 1106 (details see below), and numerous other elements and functionalities, typical of today's computers (not shown). The memory elements 1104 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 1116 for an execution. Elements inside the computer may be linked together by means of a bus system 1118 with corresponding adapters. Additionally, the address mapping system 1000 for mapping an address for memory access in a memory system may be integrated in the computer system 1100 and may also be attached to the bus system 1118.

The computing system 1100 may also include input means such as a keyboard 1108, a pointing device such as a mouse 1110, or a microphone (not shown). Alternatively, the computing system may be equipped with a touch sensitive screen as main input device. Furthermore, the computer 1100, may include output means such as a monitor or screen 1112 [e.g., a liquid crystal display (LCD), a plasma display, a light emitting diode display (LED), or cathode ray tube (CRT) monitor]. The computer system 1100 may be connected to a network [e.g., a local area network (LAN), a wide area network (WAN)], such as the Internet or any other similar type of network, including wireless networks via a network interface connection 1114. This may allow a coupling to other computer systems, or a storage network, or a tape drive. Those, skilled in the art will appreciate that many different types of computer systems exist, and the aforementioned input and output means may take other forms. Generally speaking, the computer system 1100 may include at least the minimal processing, input and/or output means, necessary to practice embodiments of the invention.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus', and/or another devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus', or another device to cause a series of operational steps to be performed on the computer, other programmable apparatus or other device to produce a computer implemented process, such that the instructions which execute on the computer, other programmable apparatus', or another device implement the functions/acts specified in the flowchart and/or block diagram block or blocks.

The flowcharts and/or block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer system for mapping an address for memory access in a memory system into a combination address comprising a memory bank identifier and a memory bank internal address indicative of an address within said memory bank, said memory system being adapted for storing data in a plurality of memory banks in an interleaved fashion, the computer system comprising:
    one or more computer processors, one or more computer-readable storage media, and program instructions stored on one or more of the computer-readable storage media for execution by at least one of the one or more processors, the program instructions comprising:
    program instructions to partition said address for memory access into a first portion, and a second portion;
    program instructions to determine said memory bank identifier by performing a look-up operation in a look-up matrix, wherein:
    a look-up matrix row is determined by the value of the first portion; and
    a look-up matrix column is determined by the value of a binary number with two or more bits formed by applying a parity function to two or more respective sub-portions of the second portion; and
    program instructions to derive said memory bank internal address based on said second portion of said address for memory access.

2. The address mapping system according to claim 1, wherein said number of memory banks equals a power-of-2 or is not equal to a power-of-2.

3. The address mapping system according to claim 1, wherein a row selection of said look-up matrix is based on said first portion of said address for memory access.

4. The address mapping system according to claim 1, wherein said second portion of said address for memory access comprises every odd bit of said address for memory access or, wherein said second portion of said address for memory access comprises every even bit of said address for memory access.

5. The address mapping system according to claim 1, further comprising program instructions to determine said second portion of said address for memory access based on entries in a mask table, wherein said mask table is implemented as a mask register.

6. A method for mapping an address for memory access in a memory system into a combination address comprising a memory bank identifier and a memory bank internal address indicative of an address within said memory bank, said memory system being adapted for storing data in a plurality of memory banks in an interleaved fashion, said method comprising:
    partitioning said address for memory access into a first portion, and a second portion;
    determining said memory bank identifier by performing a look-up operation in a look-up matrix, wherein:
    a look-up matrix row is determined by the value of the first portion; and
    a look-up matrix column is determined by the value of a binary number with two or more bits formed by applying a parity function to two or more respective sub-portions of the second portion; and
    deriving said memory bank internal address based on said second portion of said address for memory access.

7. The method according to claim 6, wherein said look-up matrix is programmable.

8. The method according to claim 6, wherein said number of memory banks equals a power-of-2.

9. The method according to claim 6, wherein said number of memory banks is not equal to a power-of-2.

10. The method according to claim 6, wherein said second portion of said address for memory access comprises every odd bit of said address for memory access.

11. The method according to claim 6, wherein said second portion of said address for memory access comprises every even bit of said address for memory access.

12. The method according to claim 6, wherein a determination of said second portion of said address for memory access is based on entries in a mask table.

13. The method according to claim 12, wherein said mask table is implemented as a mask register.

14. A computer program product for memory access in a memory system into a combination address comprising a memory bank identifier and a memory bank internal address indicative of an address within said memory bank, said memory system being adapted for storing data in a plurality of memory banks in an interleaved fashion, said computer program product comprising a computer readable storage medium having program instructions embodied therewith, said program instructions being executable by a computer to cause said computer to:
    partition said address for memory access into a first portion, and a second portion;
    determine said memory bank identifier by performing a look-up operation in a look-up matrix, wherein:
    a look-up matrix row is determined by the value of the first portion; and
    a look-up matrix column is determined by the value of a binary number with two or more bits formed by applying a parity function to two or more respective sub-portions of the second portion; and deriving said memory bank internal address based on said second portion portion of said address for memory access.

\* \* \* \* \*